US010185576B2

(12) United States Patent
Zhao et al.

(10) Patent No.: US 10,185,576 B2
(45) Date of Patent: Jan. 22, 2019

(54) METHOD AND SYSTEM FOR CUSTOMIZING A SOFTWARE APPLICATION

(75) Inventors: Jie Zhao, Shanghai (CN); Youneng Xiao, Shanghai (CN)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 13/532,445

(22) Filed: Jun. 25, 2012

(65) Prior Publication Data

US 2012/0278794 A1 Nov. 1, 2012

Related U.S. Application Data

(63) Continuation of application No. 11/828,166, filed on Jul. 25, 2007, now Pat. No. 8,209,675.

(51) Int. Cl.
*G06F 9/445* (2018.01)
(52) U.S. Cl.
CPC ................ *G06F 9/44505* (2013.01)
(58) Field of Classification Search
CPC ................ G06F 9/44505; G06F 9/44
USPC ......................................... 717/168
See application file for complete search history.

(56) References Cited

U.S. PATENT DOCUMENTS

| | | | |
|---|---|---|---|
| 5,600,778 A * | 2/1997 | Swanson et al. | 715/762 |
| 5,740,431 A | 4/1998 | Rail | |
| 5,758,071 A | 5/1998 | Burgess et al. | |
| 5,845,128 A * | 12/1998 | Noble | G06F 8/65 717/170 |
| 6,119,129 A | 9/2000 | Traversat | |
| 6,263,346 B1 * | 7/2001 | Rodriquez | G06F 8/61 709/203 |
| 6,513,152 B1 | 1/2003 | Branson et al. | |
| 6,915,486 B2 * | 7/2005 | Li | G06F 9/451 715/765 |
| 6,931,355 B2 | 8/2005 | Farrell et al. | |

(Continued)

FOREIGN PATENT DOCUMENTS

EP 0957617 11/1999

OTHER PUBLICATIONS

Song et al., "Case Study: Design of a Web-Based Service Delivery System", Jun. 2001, Drexel University (Year: 2001).*

(Continued)

*Primary Examiner* — Wei Y Zhen
*Assistant Examiner* — Junchun Wu
(74) *Attorney, Agent, or Firm* — Fish & Richardson P.C.

(57) ABSTRACT

The technique introduced here includes a uniform customization system, which can support the customization of multiple software applications simultaneously. Customization data of a software application can be developed separately from the development of the application. The customization data is then stored, via the uniform customization system, into a customization storage. When the software application is executed, the software application retrieves, from the storage, the values of the customization data via the uniform customization system. The uniform customization system outputs the retrieved customization data indicating the current working context of a user, which may be used by the user to locate customization options in a customization user interface of the software application, for customizing functions performed in the current working context.

20 Claims, 15 Drawing Sheets

(56) References Cited

U.S. PATENT DOCUMENTS

| | | | | |
|---|---|---|---|---|
| 6,981,242 B2* | 12/2005 | Lehmeier | ................ | G06F 9/453 |
| | | | | 717/122 |
| 7,062,502 B1* | 6/2006 | Kesler | ................ | G06F 17/3056 |
| | | | | 709/219 |
| 7,263,662 B1* | 8/2007 | Ballard | ................ | G06F 3/023 |
| | | | | 707/999.102 |
| 7,631,104 B2* | 12/2009 | Da Palma | ........... | G06F 9/44505 |
| | | | | 704/270 |
| 7,681,181 B2* | 3/2010 | Canning et al. | ............. | 717/127 |
| 8,065,660 B1* | 11/2011 | Tanner | ...................... | G06F 8/20 |
| | | | | 709/223 |
| 2002/0143784 A1* | 10/2002 | Sluiman | ........................ | 707/100 |
| 2002/0198876 A1* | 12/2002 | Zielinski | ............. | G06F 9/45512 |
| | | | | 717/115 |
| 2003/0030664 A1* | 2/2003 | Parry | ................... | G06F 9/4411 |
| | | | | 715/744 |
| 2003/0063120 A1 | 4/2003 | Wong et al. | | |
| 2003/0067485 A1 | 4/2003 | Wong et al. | | |
| 2004/0056894 A1 | 3/2004 | Zaika et al. | | |
| 2004/0260718 A1 | 12/2004 | Fedorov | | |
| 2005/0076364 A1 | 4/2005 | Dukes et al. | | |
| 2005/0187912 A1 | 8/2005 | Matsha et al. | | |
| 2005/0240881 A1* | 10/2005 | Rush et al. | ................... | 715/851 |
| 2006/0010434 A1* | 1/2006 | Herzog | ............... | G06F 9/44505 |
| | | | | 717/168 |
| 2006/0036998 A1 | 2/2006 | McKenna et al. | | |
| 2007/0079238 A1* | 4/2007 | Weinkauff | .............. | G06F 9/451 |
| | | | | 715/700 |
| 2007/0094671 A1* | 4/2007 | Stephens | ............... | G06F 9/5016 |
| | | | | 718/105 |
| 2007/0233935 A1* | 10/2007 | Amiri et al. | ................... | 711/100 |
| 2008/0098099 A1* | 4/2008 | Khasnis | .................... | G06F 8/61 |
| | | | | 709/222 |
| 2008/0270978 A1* | 10/2008 | Leung | .................... | G06F 9/451 |
| | | | | 717/106 |
| 2009/0013309 A1* | 1/2009 | Shavlik | ........................ | 717/120 |

OTHER PUBLICATIONS

Berry et al., "Custom Data Entry Form System for Software Applications", Apr. 1992, IBM (Year: 1992).*

Nordheim et al., "Customization of Enterprise Content Management Systems: An Exploratory Case Study", 2004, IEEE (Year: 2004).*

Artail, "Data and presentation techniques for fast, simple, and automatic plotting", Sep. 2002, Elsevier (Year: 2002).*

Search Report and Opinion dated Nov. 7, 2008 for European Patent Application No. EP08012693.

* cited by examiner

```
public interface CustomizationController {

/* Implemented by customization developer. Controls
     * the physical storage and access of customization
     * entry data.
     * The storage medium can be file system, database or
     * Windows registry, etc.
     */

// Get a single customization category by name.
    // Namespace is used to avoid naming conflict. It can
    // be a combination of the vendor name, URL or GUID
    // and so on.
    CustomizationCategory getCategory(String name, String
            namespace)

ArrayList<CustomizationCategory> getAllCategories();

// Implemented by customization developer and called
    // by the UI developer. The customization UI
    // information will be set here together with the
    // customization entry value.
    public void setCustomizaitonValue(CustomizationEntry
            entry, Object value, ArrayList<Object> conditions,
            CustomizaitonUIInfo ui_info);

// Implemented by customization developer and called
    // by application developer.
    // It gets the preset customization entry value with
    // run time conditions and automatically logs the
    // customization evaluation procedure and run time
    // context.
    // Must be called inside the scope of a customization
    // transaction. Otherwise the exception
    // NoAssociatedTransactionException would be thrown.
    public Object getCustomizationValue(CustomizationEntry
            entry, ArrayList<Object> conditions)
        throws NoSuchCustomizaitonEntryFoundException,
            NoAssociatedTransactionException;
}
```

Figure 6A

```
public interface CustomizationCategory {
      /* A category of customization. It can contain
       * sub-categories and/or customization entries
       */

// Get the name of the category
      String getName();

// Get specific category by name
      CustomizationCategory getCategory(String name);

// Get a single customization entry under this category
      CustomizationEntry getEntry(String name);

// Get all sub-categories
      ArrayList<CustomizationCategory> getAllSubCategories();

// Get all entries
      ArrayList<CustomizationEntry> getAllEntries();
}
```

Figure 6B

```
public interface CustomizationEntry {
      /* Customization are finally reflected by value of customization
       * entries. A customization entry can have a data type like
       * boolean, integer, and string.
       */

// Get the name of the entry e.g. "DeliveryAutomaticCreation"
      String getName();

// Get data type of the customization value e.g. Integer.Class,
      // String.Class, etc.
      Class getType();

// Get the range of the customization values
      CustomizaitonValueRange getValueRange();

```
public interface CustomizationValueRange {
        /* Value range of a customization entry. It can have
         * sub ranges. This is particularly for the descrete
         * situations.
         */

// Get all sub-ranges. The ranges can be non-continous
        ArrayList<CustomizationValueRange> getSubranges();

// Determine whether a value is in the range
        boolean fit(Object value);

// Get the data type e.g. Integer.Class
        Class getType();

// Get the maximum and minimum values of this range.
        // If it's an unlimited range, an exception will be
        // thrown.
        Object getMaxValue()throws NoMaxValueDefinedException;
        Object getMinValue()throws NoMinValueDefinedException;
}
```

Figure 6D

```
public class CustomizationUIInfo {

// The path to reach customization entry e.g. "Menu
        // 'Tools' -> 'Options' -> tab 'General'".
        void setPath(String path);
        String getPath();

```
public class CustomizaitonAccessor {

/* The implementation of this class is provided by
     * the framework. It takes the responsibility of
     * initializing the CustomizationController interface
     * using specific implementation.
     */

// Initialize and return the customization controller
    // instance specified by the property parameter.
    public CustomizationController
        getCustomizationController(Properties properties);

// Begin the recording of RCE (Runtime Customization
    // Evaluation) procedure. Application developer calls
    // this method to start a new customization
    // transaction. The customization value can only be
    // retrieved in the scope of a transaction.
    public void beginTransaction(String name) throws
        AnotherTransactionStartedException;

// End the customization transaction, stopping logging
    // the RCE procedure.
    public void endTransaction() throws
        NoTransactionStartedException;

// Generate a report for the latest runtime
    // customization evaluation. With this information,
    // user will have the knowledge of related
    // customization entries and run time context. For
    // them, it is easy to jump to the place to adjust
    // customization values.
    public String getReport(boolean ui_info_included);
}
```

Figure 6F

[2007.03.08 18:08:05] RCE Transaction started
[2007.03.08 18:08:09] Customization Category=SalesOrder
[2007.03.08 18:08:09] Customization Entry Name=SalesOrderType
[2007.03.08 18:08:09] Entry Value=StandardOrder (String)
[2007.03.08 18:08:09] UIInfo=Transaction SPRO ->...-> Checkbox "Sales Order Type"

[2007.03.08 18:08:12] Customization Category=SalesOrder
[2007.03.08 18:08:12] Customization Entry Name=DeliveryAutoCreation
[2007.03.08 18:08:12] Entry Value=True (Boolean)
[2007.03.08 18:08:12] UIInfo= Transaction SPRO ->...-> Checkbox "Delivery Created Automatically"

Figure 6G

METHOD AND SYSTEM FOR CUSTOMIZING A SOFTWARE APPLICATION

CLAIM OF PRIORITY

The present patent application is a Continuation of, and claims priority to and incorporates by reference in its entirety, the corresponding U.S. patent application Ser. No. 11/828,166, entitled "Method and System for Customizing Software Application" filed on Jul. 25, 2007, and issued as U.S. Pat. No. 8,209,675 on Jun. 26, 2012.

FIELD OF THE INVENTION

This invention relates to software application customization. More specifically, this invention relates to a method and system of facilitating a user to quickly locate customization options in a user interface for customizing a software application.

BACKGROUND

Today, computer already becomes the standard equipment in office. Software vendors have found it increasingly important to improve user productivity by enhancing software usability. One important aspect of enhancing software usability is to give users more flexible customization options so that the application can be configured due to the user's specific needs.

In known art, a software application (such as an enterprise application) can be customized via a centralized customization user interface. FIG. 1 is an example of a centralized customization user interface. As shown, the user interface 100 includes customization tree containing a number of customization categories 101 and a number of customization entries 102. A customization category 101 can contain one or more other customization categories 101 and/or one or more customization entries 102. If a customization category is contained within another customization category, the contained customization category can also be called a sub-category. Each customization entry 102 is associated with a value range, within which a value can be specified to customize the behavior of the software application.

Thus, centralized customization user interface organizes all customization entries in one place. If a user has knowledge about the customization entry, the user can quickly locate the customization entry by navigating through the category and subcategories containing the customization entry. But it requires the user to have an overall understanding of the functionalities provided by the software application and their relationship with customization entries. It might take an inexperienced user a lot of time to explore the customization tree to find the right customization entry. For enterprise software applications such as enterprise resource planning (ERP) and customer relationship management (CRM), customization options are even more complicated. Therefore, a technique to facilitate an inexperienced user to quickly locate customization options to customize a software application is desired.

SUMMARY

A technique that provides a method and system for customizing a software application. The method includes executing a function of the software application to be customized. The method further includes, in response to executing the function of the software application, outputting information indicating how to locate a customization entry associated with the function in a customization user interface of the software application.

Other aspects of the invention will be apparent from the accompanying figures and from the detailed description which follows.

BRIEF DESCRIPTION OF THE DRAWINGS

FIGS. 6A-6G are pseudo code illustrating examples of data structures used to implement a customization system, according to certain embodiments of the invention.

DETAILED DESCRIPTION

Described herein are methods and systems for customizing a software application. In the following description, numerous specific details are set forth. However, it is understood that embodiments may be practiced without these specific details. For example, well known equivalent components may be used in place of those described herein. In other instances, well known components have not been shown in detail in order not to obscure the understanding of this description.

The technique introduced here includes a uniform customization system, which can support the customization of multiple software applications simultaneously. Customization data of a software application can be developed separately from the development of the software application. The customization data is then stored, via the uniform customization system, into a customization storage. When the software application is executed, the software application retrieves, from the storage, the values of the customization data via the uniform customization system. The uniform customization system outputs the retrieved customization data to indicate the current working context of a user, which may be used by the user to locate customization options in a customization user interface of the software application, for customizing functions performed in the current working context.

This solution helps the end users, especially the inexperienced or casual users, quickly and correctly find the right customization entries to adjust for desired application behavior. The essential part of the solution is the Runtime Customization Evaluation (RCE) mechanism. Customization entries, combined together, determine the application behavior during run time. Application program evaluates the value of customization entries to determine how it behaves. RCE is a procedure in which multiple customization entries are evaluated and the evaluation procedure is recorded. Based on the log of records, user can easily know which customization entries are involved in the current working context and adjust them by directly navigating to the customization environment.

Customization evaluation log is written by the framework automatically. The end user is given the whole picture of behaviors determination automatically based on the RTTI (Run Time Type Identification) technologies.

Figure 2A:
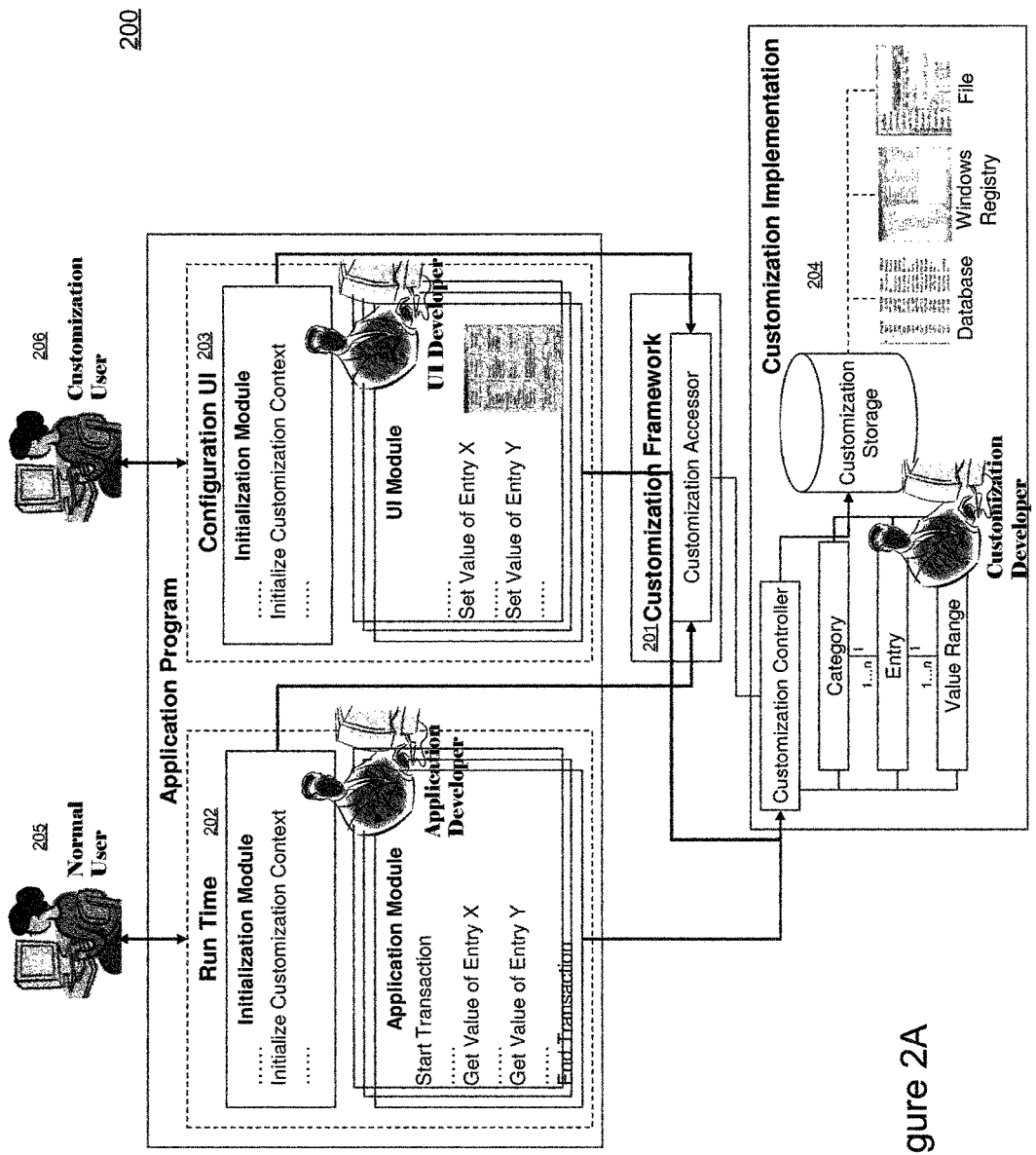
FIGS. 2A-2C illustrate an exemplary architecture of a customization system, according to certain embodiments of the present invention.

FIG. 2A is a block diagram illustrating architecture of a customization system according to one embodiment of the invention. In the collaborative development of application customization as shown in FIG. 2A, developers are categorized into three roles: 1) customization developer, 2) application developer, and 3) user interface (UI) developer. Each role has its specific focus and requirements.

Referring to FIG. 2A, customization developer is responsible for implementing structures of customization information, the data storage, and access of customization entries as part of customization implementation 204. These structures focus on storing and retrieving customization information in the specific storage medium which may be a file, database or Windows registry. Application developer is interested in getting customization values. Their program needs to retrieve values of specific customization entry in order to determine the application behavior as part of the runtime unit 202. Application developers are less concerned about the underlying storage medium of customization information. User interface developer is responsible for developing the customization UI. Developers with this role implement the layout of customization UI as part of configuration UI 203. They have the most exact knowledge where to set a customization entry. Such location information may be stored together with the target customization entry.

Referring to FIG. 2A, according to one embodiment, system 200 includes, but is not limited to, a customization framework, application run time unit 202, application configuration time unit 203, and customization implementation unit 204. Units 202-204 interact with the framework 201. These three components (e.g., application run time unit 202, application configuration time unit 203, and customization implementation unit 204) may be developed and maintained by customization developers, application developers and UI developers respectively and/or independently, for example, using object oriented programming techniques. There are two roles of end users: a normal user 205 and a customization user 206. Normal user 205 uses the software to do their daily job. Yet customization user 206 performs the customization. Normal user 205 interacts with application run time unit 202 while the customization user 206 interacts with the configuration UI unit 203. Note that these two roles might sometimes be the same user, since in many circumstances normal users have to do the customization themselves.

Figure 2B:
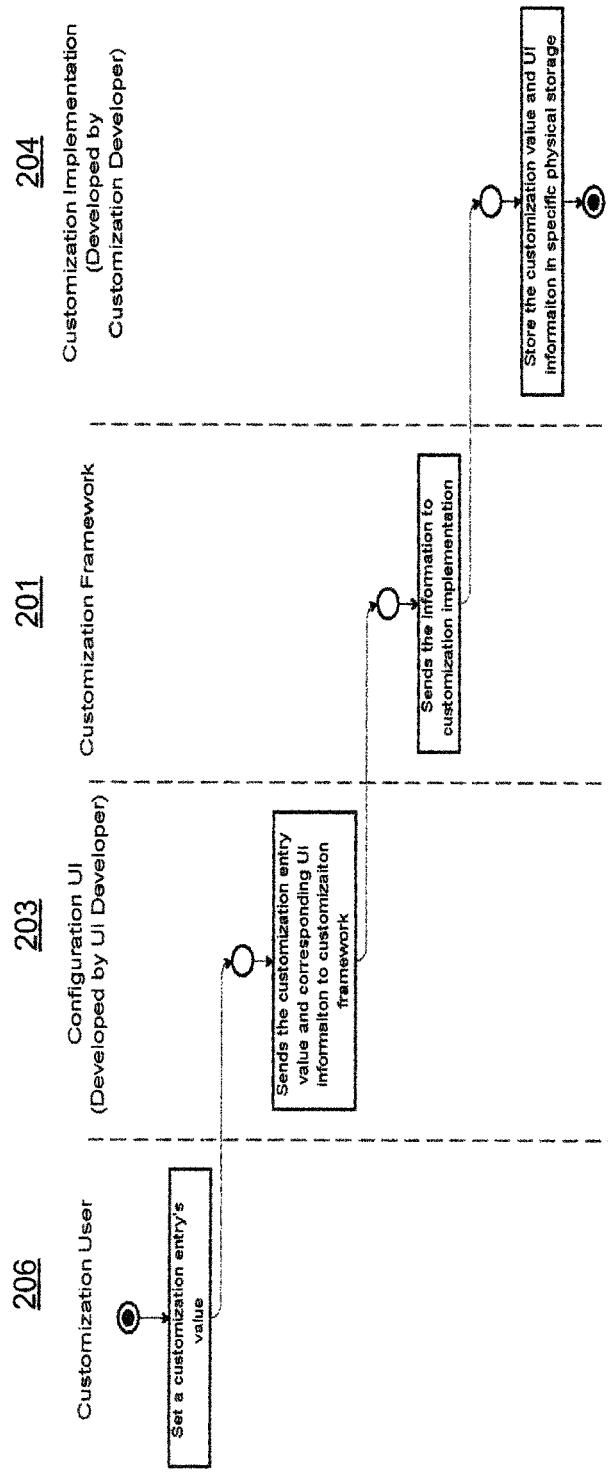
Figure 2C:
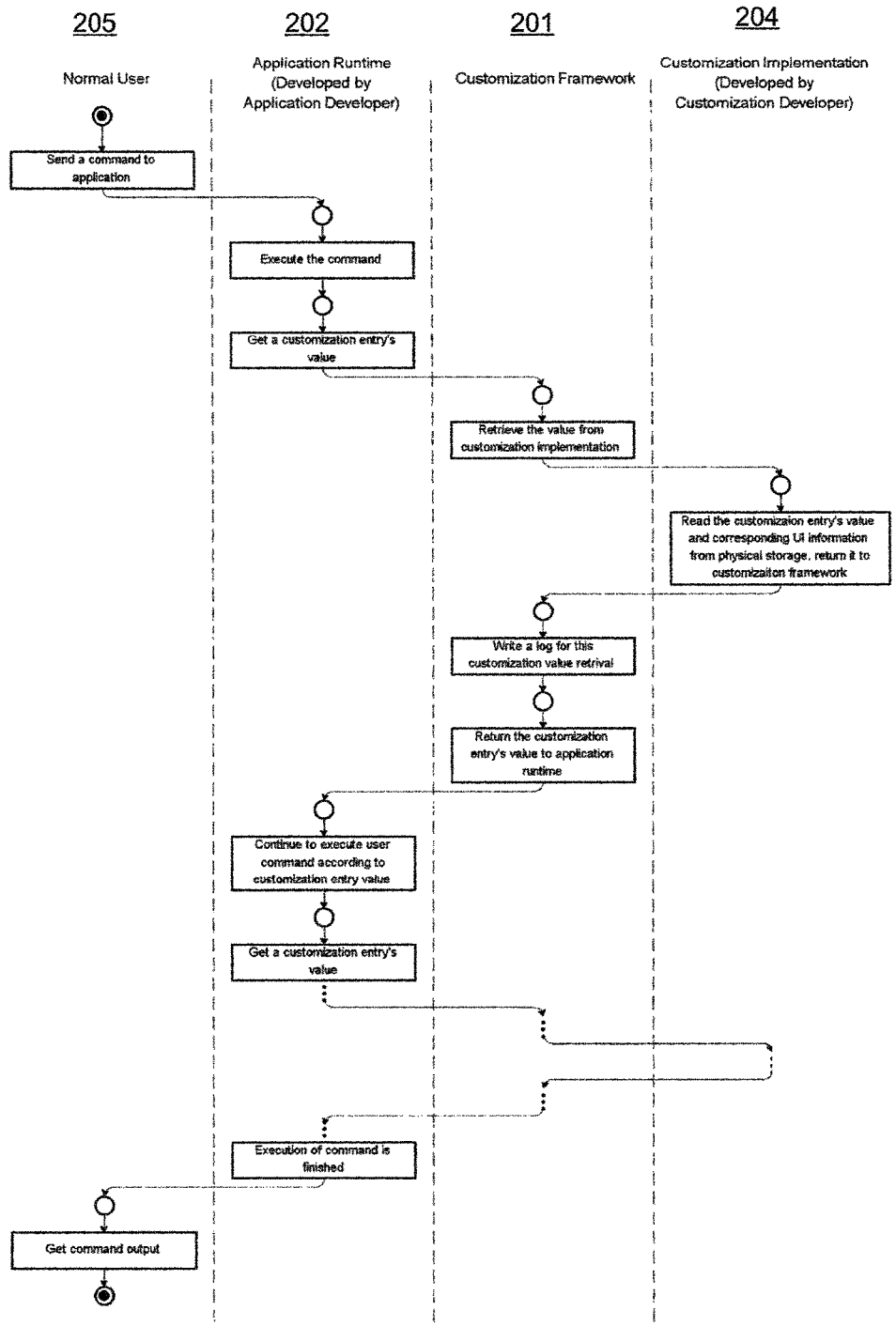

When a customization user adjusts customization entry, different components are involved as shown in FIG. 2B. At runtime, as shown in FIG. 2C, application's process of user command execution is affected by multiple customization entries. During the command execution, values of these entries are retrieved from backend storage. Referring back to FIG. 2B the customization UI information is stored together with customization entry value. Now the UI information is retrieved as well. According to one embodiment, the information of customization entry and corresponding UI is written to a log. From the log, user can easily know which customization entries affect current application's behavior and where to adjust the entries. In one embodiment, the retrieval of customization entry value is performed via customization framework 201. Therefore all customization evaluation activities are recorded by the framework 201 automatically. Further, the customization framework 201, instead of the application, is responsible for log writing. So the application developer can focus on the implementation of business logic. Note that some or all of the components or operations as shown in FIGS. 2A-2C may be implemented or performed by processing logic which may includes software, hardware, or a combination of both.

Figure 3A:
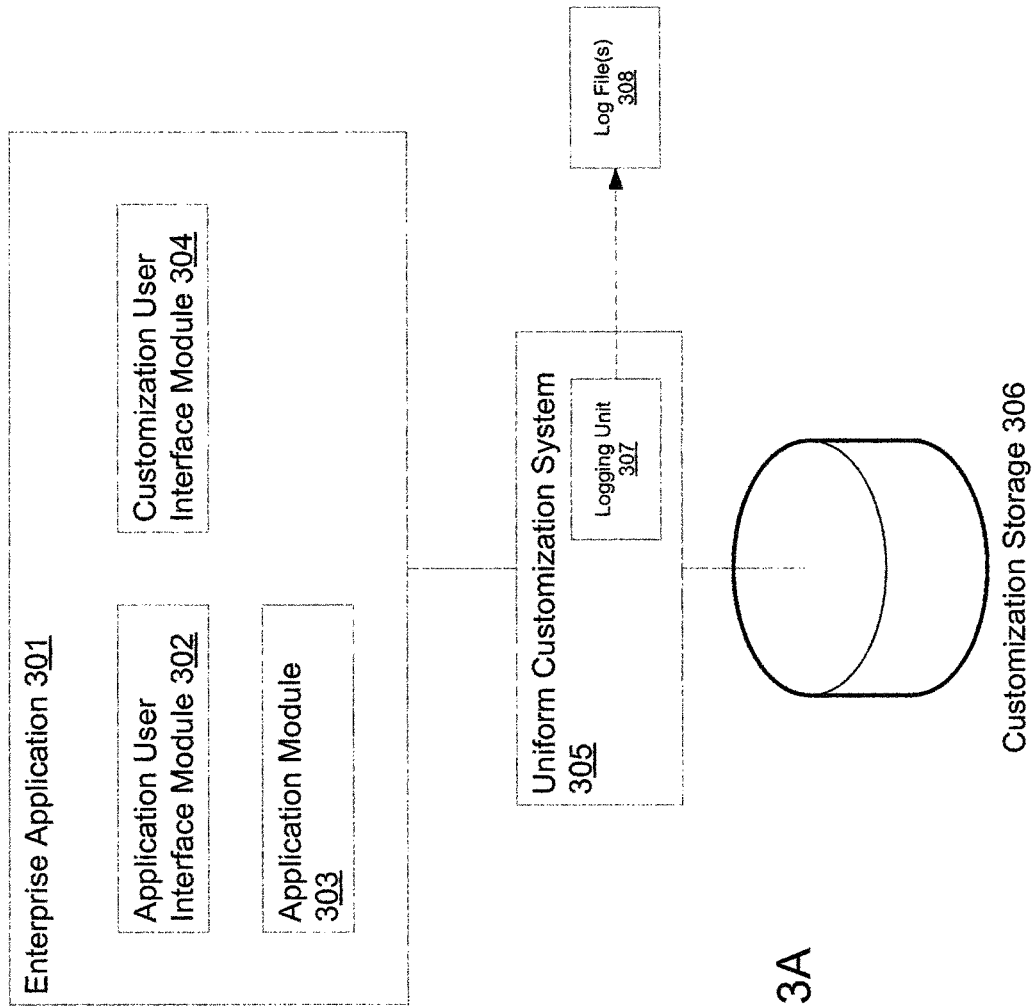
FIGS. 3A-3C illustrate an exemplary architecture of a customization system, according to certain embodiments of the present invention.

FIG. 3A illustrates an exemplary architecture of a customization system, according to an embodiment of the present invention. As shown, an enterprise application 301 (e.g., an ERP application, a CRM application, etc.) is connected to a uniform customization system 305. The uniform customization system 305 provides a common customization service to different applications (including the enterprise application 301). That is, customization requests from different applications can be processed by the uniform customization system 305 simultaneously. Thus, instead of developing a specific customization module for each application, a uniform customization system can be used for multiple applications (even simultaneously). The uniform customization system 305 is coupled to a customization storage 306 located either locally or remotely, which stores customization data for each application. In one embodiment, the customization storage 306 is part of the uniform customization system 305 and includes a database, a file, an operating system registry (e.g., Windows® registry, etc.).

Figure 1:
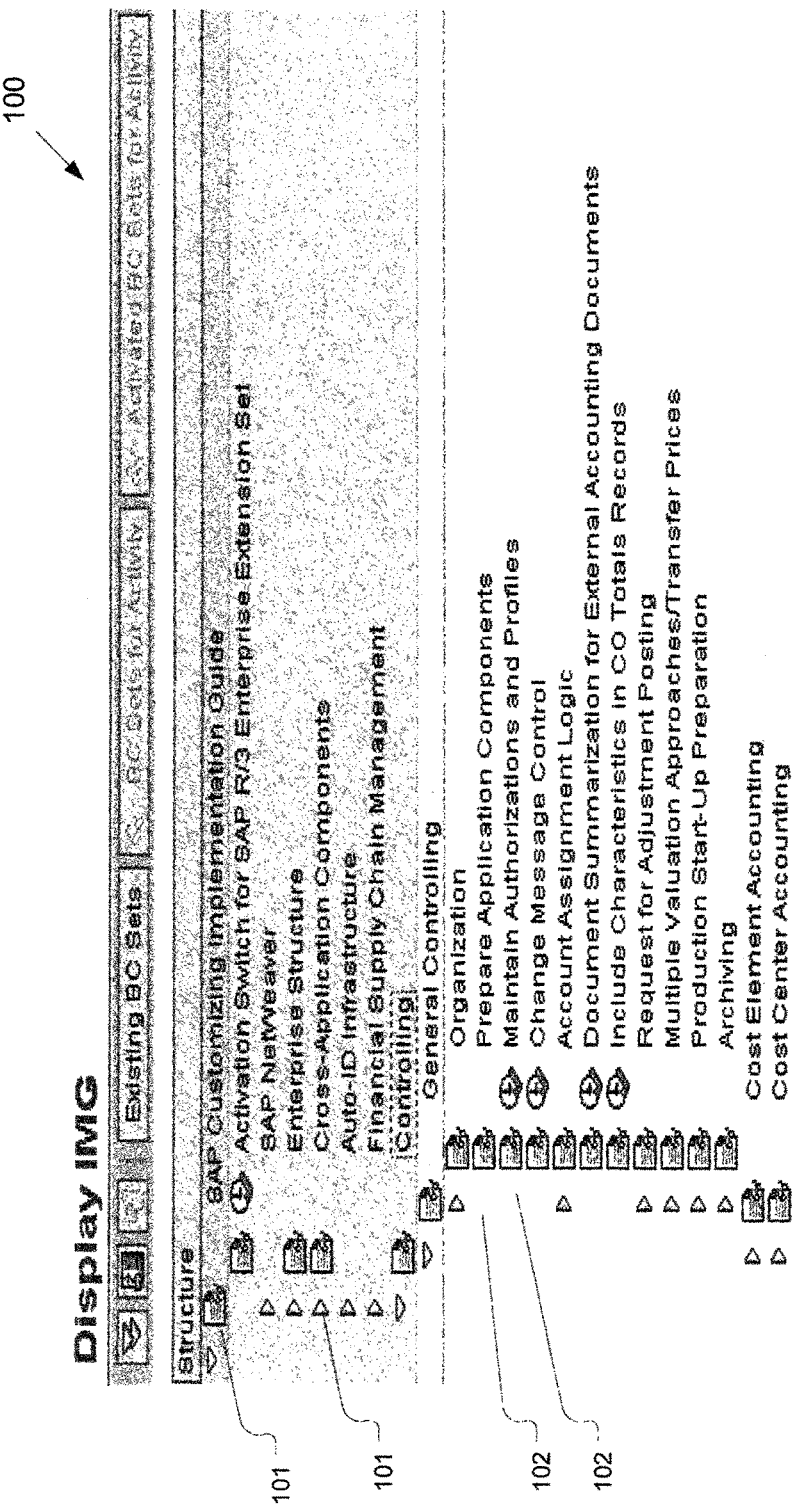
FIG. 1 is an example of a centralized customization user interface for customizing a software application.

The enterprise application 301 includes an application user interface module 302 and an application module 303. The application module 302 provides one or more functions (e.g., generating a monthly sales report, printing a document, sending an email, etc.) Some of the functions may be customized according to the technique introduced here. The application user interface module 302 receives requests from a user to execute one or more of the functions provided by the application module. In one embodiment, the application user interface module 302 includes a graphical user interface (GUI). The enterprise application 301 further includes a customization user interface module 304. In one embodiment, the customization user interface module 304 can be implemented as a centralized customization user interface, such as illustrated in FIG. 1. As illustrated in FIG. 1, the customization user interface module 304 can provide a customization tree containing a number of customization categories 101 and a number of customization entries 102. As introduced above, a customization category 101 can contain one or more other customization categories 101 and/or one or more customization entries 102. Each customization entry 102 is associated with a value range, within which a value can be specified to customize the behavior of the enterprise application 301.

In one embodiment, the customization user interface module 304 receives user inputs to change the value of a customization entry. Upon receiving the inputs, the customization user interface module 304 sends a customization request to the uniform customization system 305. In one embodiment, the customization request includes the identification (ID) of the customization entry and the new value to be set for the entry. The request can be sent to the uniform customization system 305 via messaging or by calling an application programming interface (API) provided by the uniform customization system 305. Upon receiving the request, the uniform customization system 305 searches the customization entry in the customization storage 306 and sets the new value to the customization entry. Details of the process are further explained below.

Note that the enterprise application 301, the uniform customization system 305, and the customization storage 306 can be deployed on a same processing system (a server, for example) or on different processing systems. The different processing system can run different operating systems.

Figure 7:
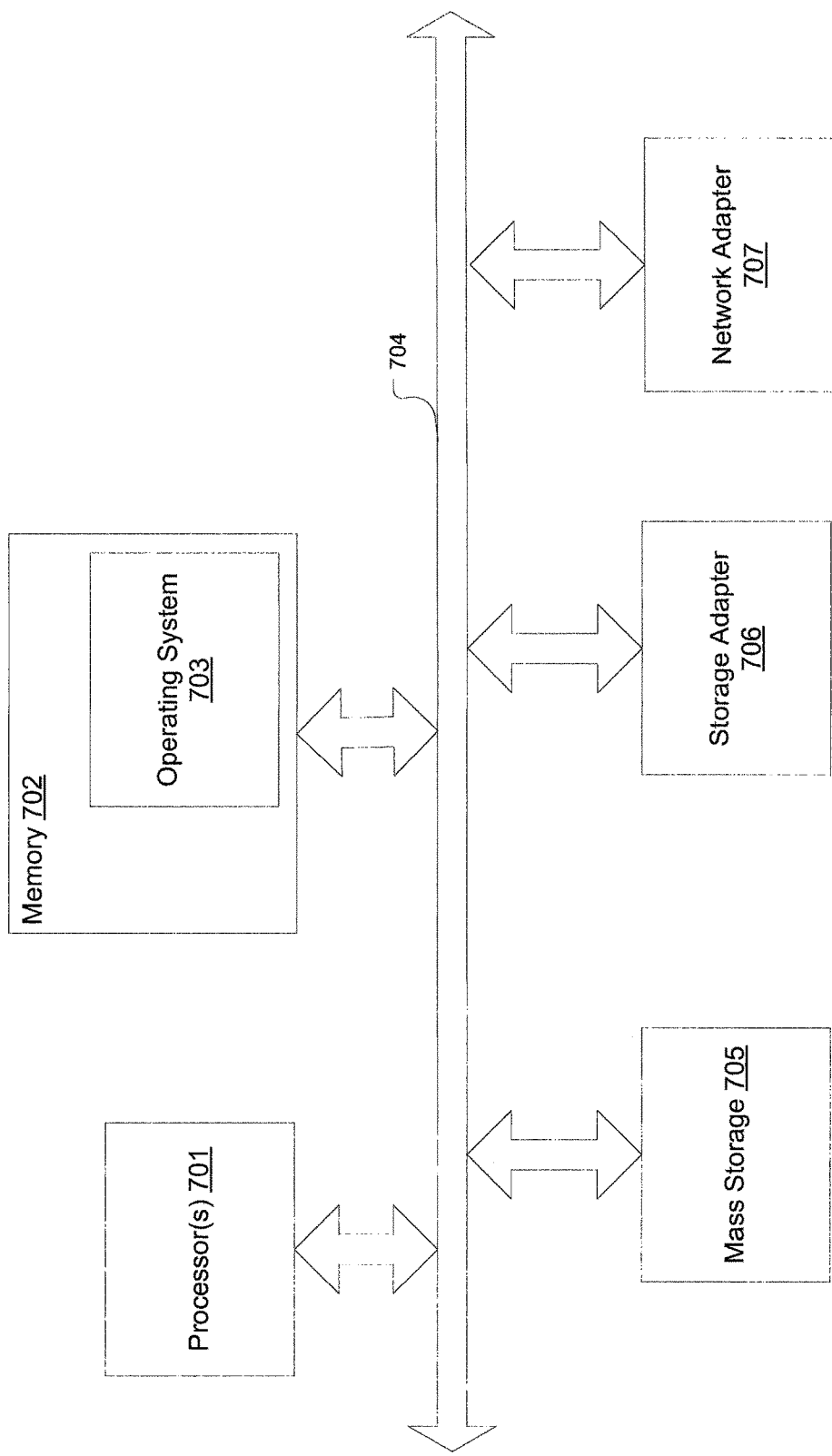
FIG. 7 is a high level block diagram of a processing system which may be used with one embodiment of the invention.

In addition, according to one embodiment, uniform customization system 305 includes a logging unit 307 to output access information of customized entries during runtime to a log 308 to allow a user to evaluate the processes of utilizing customization entries at runtime. In one embodiment, the log 308 is stored in a temporary memory area (e.g., memory 702 as shown in FIG. 7), a file, or a database.

Figure 3C:
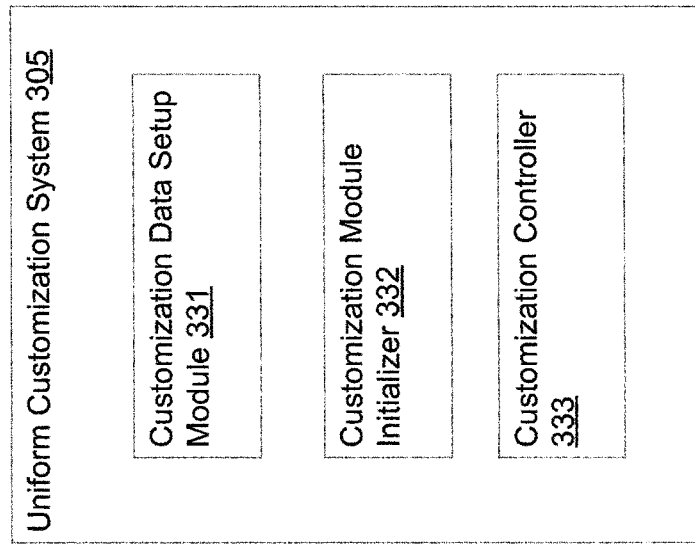
Figure 3B:
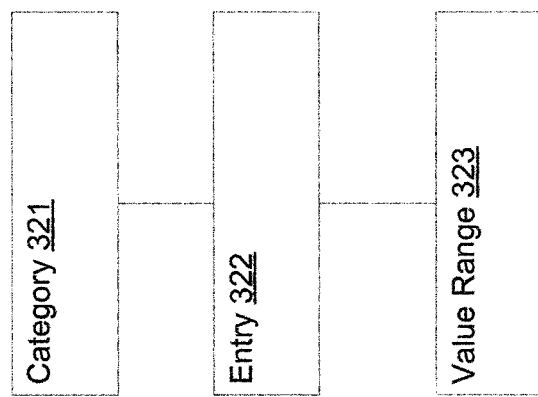

FIG. 3B illustrates an example of the customization storage shown in FIG. 3A, according to an embodiment of the present invention. In one embodiment, customization data is stored as customization categories 321, customization entries 322, and value ranges 323 in the customization storage 306. As discussed earlier, a customization category 321 can contain one or more other customization categories 321 (i.e., subcategories) and one or more customization entries 322. Each customization entry 322 is associated with a value range 323, which specifies a range of values that can be set for the customization entry. In one embodiment, the customization storage 306 is a relational database. Customization categories 321, customization entries 322, and value ranges 323 are stored as tables. In another embodiment, the customization storage 306 is an object database. Customization categories 321, customization entries 322, and value ranges 323 are stored as objects in the storage 306.

Customization data can be developed while a developer is developing the customization user interface module 304. For example, when the developer designs the customization user interface, the developer determines what customization categories and customization entries are needed, and what value ranges each customization entry should have according to, for example, the business requirement. The developer can also assign a default value for each of the customization entries. Then, the customization data can be entered into the customization storage 306. Thus, one advantage provided by the uniform customization system is that the development of a software application and its customization can be carried out by different developers without interference.

FIG. 3C illustrates an example of a uniform customization system shown in FIG. 3A, according to an embodiment of the present invention. As shown, the uniform customization system 305 includes a customization data setup module 331. In one embodiment, the customization data of an application is created by a customization developer and is stored in a document (e.g., an XML document, etc.) The customization data setup module 331 parses the document and creates corresponding customization categories 321, customization entries 322, and value ranges 323 in the customization storage 306. Yet in another embodiment, the customization data setup module 331 provides a user interface (not shown), through which a customization user can enter the customization data manually.

The uniform customization system 305 also includes a customization module initializer 332 and a customization controller 333. In one embodiment, the customization module initializer 332 receives a connection request (or an initialization request) from an application, such as the enterprise application 301. Upon receiving the request, the customization module initializer 332 creates an instance of the customization controller 333, which is assigned to process customization requests from the application. Thus, for example, if two applications are connected to the uniform customization system 305, two customization controller instances would be created to serve the two applications, respectively.

After an instance of the customization controller 333 is created, the customization user interface module 304 uses the created customization controller instance to retrieve or set values of entries stored in the customization storage 306. For example, a customization entry may be "whether or not to automatically create a monthly sales report". The value range for the entry is "yes" or "no". If a user chooses to set the customization entry as "yes" via the customization user interface module 304, the customization controller instance will be called by the customization user interface module 304 to search the customization entry in the customization storage 306 and set the value of the customization entry as "yes".

Figure 4A:
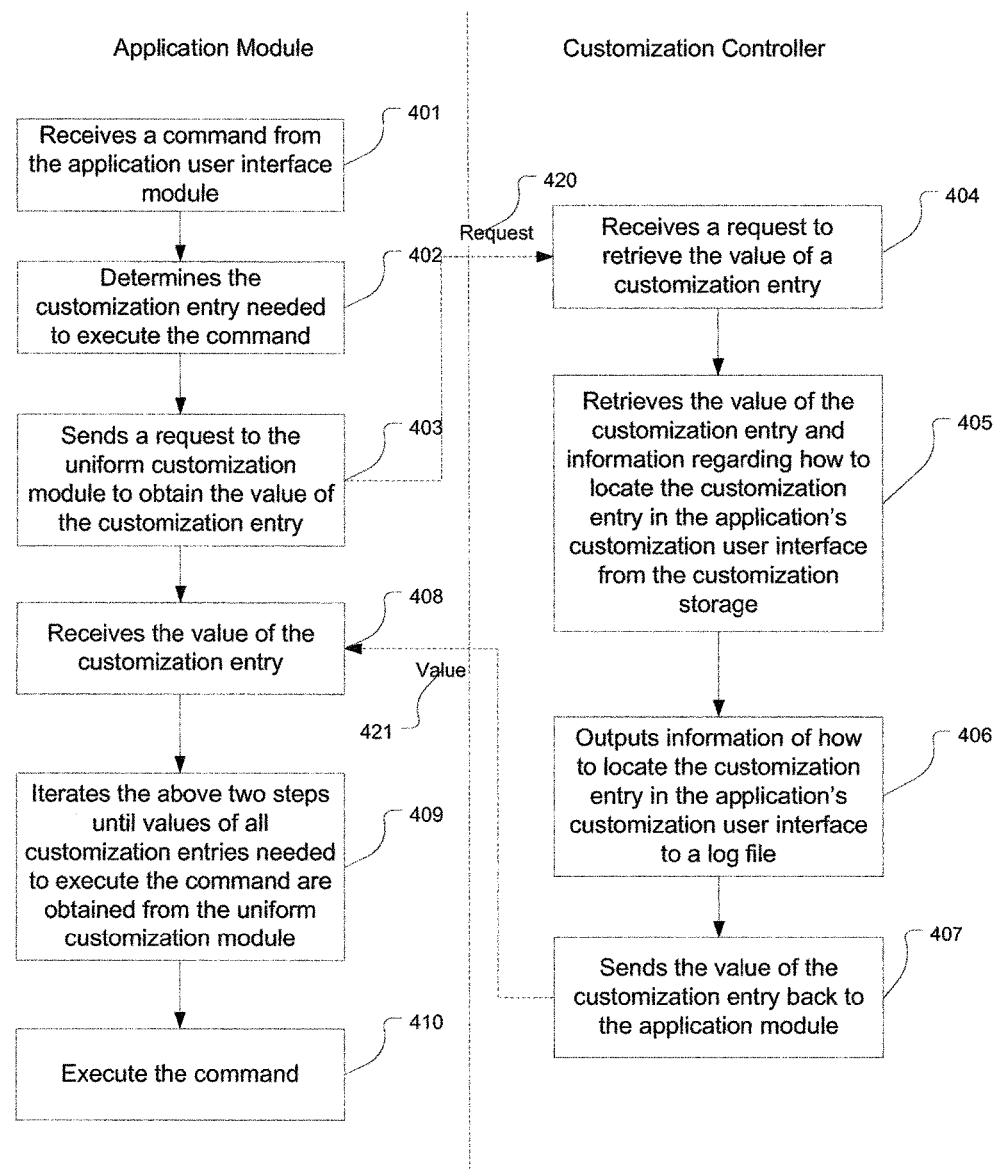
FIGS. 4A-4B are flow diagrams illustrating processes of customizing a software application, according to certain embodiments of the present invention.

FIG. 4A is a flow diagram illustrating a process of executing a function of a software application, according to an embodiment of the present invention. Note that the process as shown in FIG. 4A may be performed by processing logic which may include software, hardware, or a combination of both. As shown, the blocks shown in the left column are part of a process of the application module 303 (shown in FIG. 3A). The blocks shown in the right column are part of a process of the customization controller 333 (shown in FIG. 3C). It is assumed that during the initialization of application module 303, the application module 303 calls the customization module initializer 332 of the uniform customization system 305. The customization module initializer 332 creates an instance of the customization controller 333 and returns a handle or reference of the instance to the application module 303.

At block 401, the application module 303 receives a command from the application user interface module 302. The command may be, for example, a request to perform a function (e.g., sending an email, printing a document, etc.) provided by the application module 303. At block 402, the application module 303 determines the customization entries needed to execute the command. In one embodiment, the values of these customization entries affect how the function is performed. For example, suppose the function is to print a document and a customization entry is "using double side printing", if the value of the customization entry "using double side printing" is "yes", the document would be printed on both sides of the paper. Thus, at block 403, the application module 303 sends a request 420 to the instance of the customization controller 333 to obtain the value of the first determined customization entry, by using the handle or reference of the instance.

At block 404, the instance of the customization controller 333 receives the request to retrieve the value of the first determined customization entry. At block 405, the customization controller instance retrieves, from the customization storage 306, the value of the customization entry and information regarding how to locate the customization entry in the application's customization user interface. In one embodiment, such information regarding how to locate the customization entry in the application's customization user interface is part of the customization data created by a customization developer, and is stored together with the customization entry in the customization storage 306 by the customization data setup module 331.

At block 406, the instance of the customization controller 333 outputs the information of how to locate the customization entry in the application's customization user interface into a log file. Other information outputted into the log file may include the name, value, and ID of the customization entry. At block 407, the instance sends the value 421 of the customization entry back to the application module.

At block 408, the application module 303 receives the value of the first determined customization entry. At block 409, the application module 303 and the instance of the customization controller 333 iterate the blocks 403-408 until values of all customization entries needed to execute the command are obtained from the uniform customization system 305. At block 410, based on the values, the command is executed.

Figure 4B:
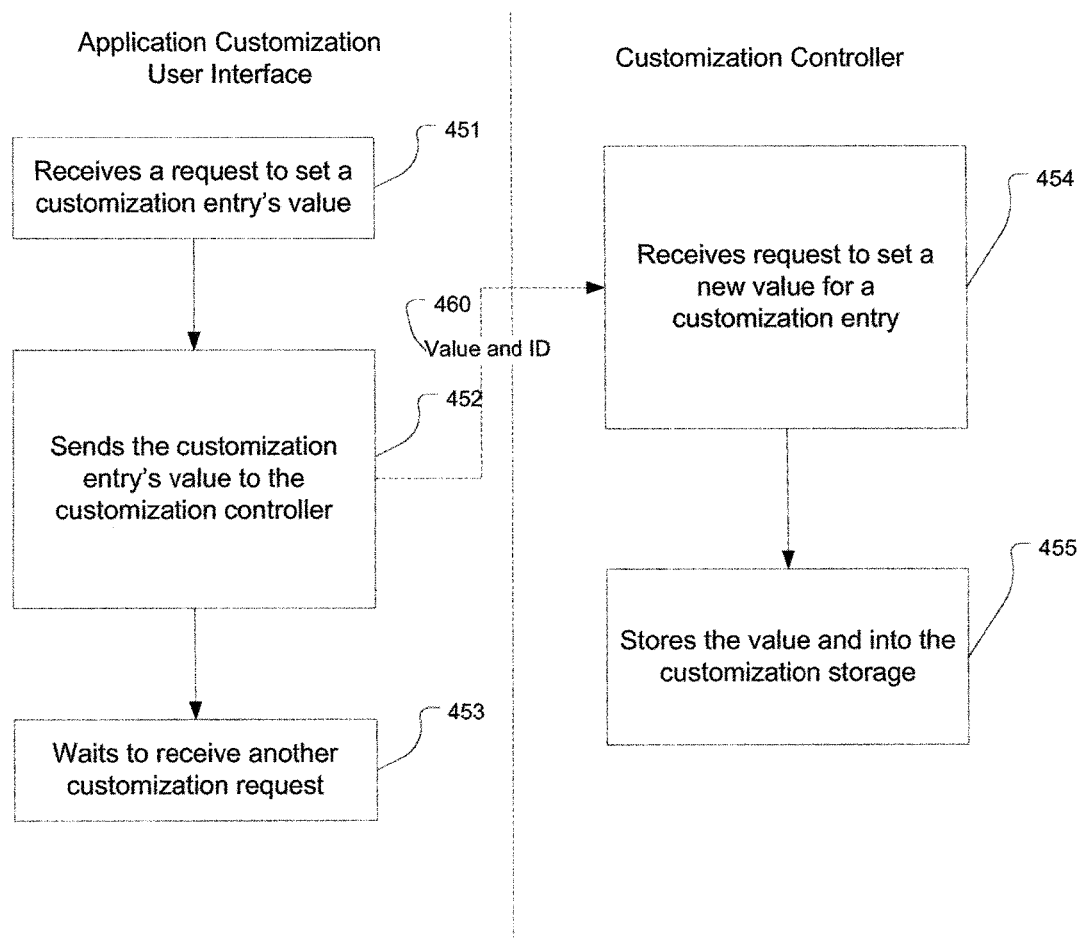

FIG. 4B is a flow diagram illustrating a process of setting a customization entry to customize a software application, according to an embodiment of the present invention. Note that the process as shown in FIG. 4B may be performed by processing logic which may include software, hardware, or a combination of both. As shown, the blocks shown in the left column are part of a process of the customization user interface module 304 (shown in FIG. 3A). The blocks shown in the right column are part of a process of the customization controller 333 (shown in FIG. 3C). It is assumed that during the application module 303's initialization, the application module 303 calls the customization module initializer 332 of the uniform customization system 305. The customization module initializer 332 creates an instance of the customization controller 333 and returns a handle or reference of the instance to the application module 303.

At block 451, the customization user interface module 304 receives a request to set a customization entry's value. This may be triggered by a user's input via the user interface. For example, the user may check a checkbox to choose an option. At block 452, the customization user interface module 304 sends the customization entry's ID and value 460 to the instance of the customization controller 333. At block 453, the customization user interface module 304 waits for another customization input from the user. At block 454, the instance of the customization controller 333 receives the customization entry's value and ID. At block 455, the instance searches the customization entry by the received ID and sets the value.

Figure 5:
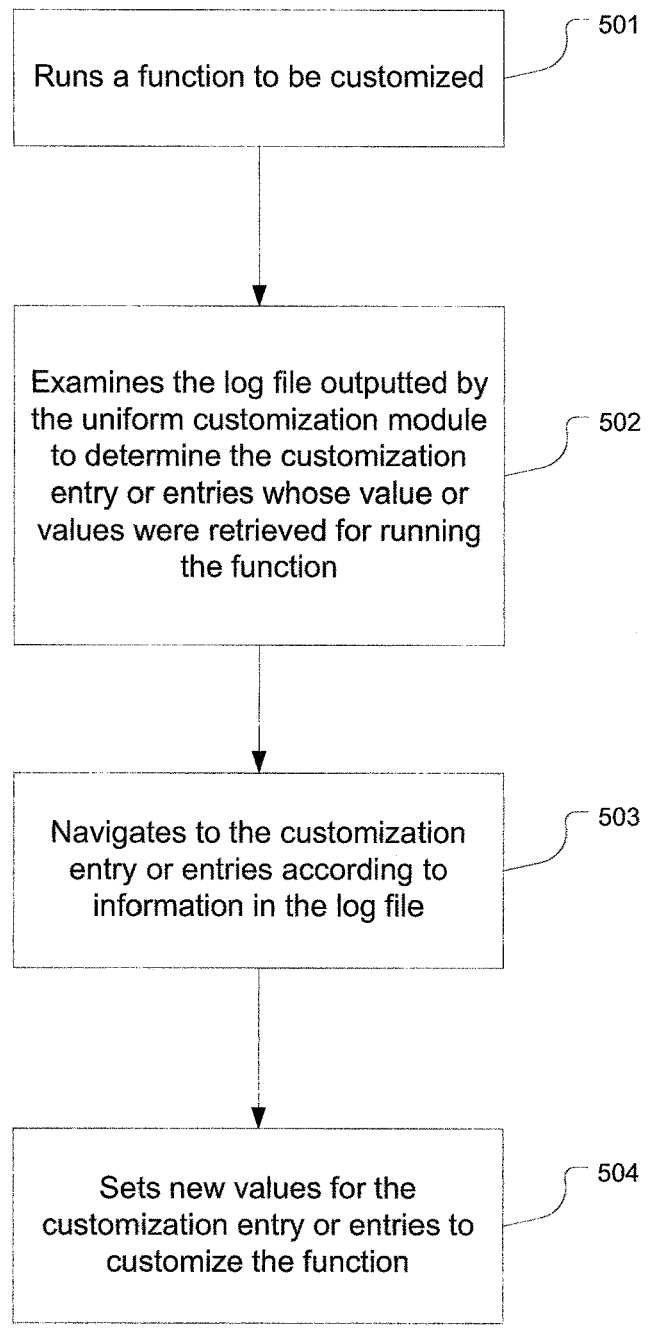
FIG. 5 is a flow diagram illustrating a process of customizing a software application, according to an embodiment of the present invention.

FIG. 5 is a flow diagram illustrating a process of customizing a software application, according to an embodiment of the present invention. Note that the process as shown in FIG. 5 may be performed by processing logic which may include software, hardware, or a combination of both. It is assumed that a user wants to customize a function of a software application, but does not know where to find the customization entries in the centralized customization user interface (shown in FIG. 1) to customize the function.

At block 501, the user runs the function to be customized. As discussed in FIG. 4A, the uniform customization system 305 outputs, in a log file, the customization entries (and information of how to locate them in the user interface) whose values are retrieved for running the function. At block 502, the user examines the log file to determine the customization entries and information of how to locate them in the user interface.

At block 503, according to the information, the user can navigate to the customization entry or entries in the centralized user interface (such as shown in FIG. 1). At block 504, the user sets new values for the customization entries to customize the function. Thus, even though a user is not familiar with the customization user interface and does not know which customization entries are needed to customize a function, the user can quickly identify and locate these customization entries by using the method and system introduced above. Other operations may also be performed.

Referring back to FIG. 2A, the work area of a customization developer is in the customization implementation unit 204. Customization developers focus on the structure of customization information and how to store/retrieve data to/from specific storage type. How to display the customization data and how to evaluate customization entries' value should be transparent from the customization developers, for example, using object oriented programming techniques. What customization developer need is a standardized way to represent structural customization data.

FIGS. 6A-6G are pseudo code representing examples of certain implementation of the techniques described above, according to certain embodiments, For the purposes of illustration only, referring to FIGS. 6A-6H, data structures are represented by interfaces of CustomizationCategory (e.g., as shown in FIG. 6B), CustomizationEntry (e.g., as shown in FIG. 6C), and CustomizationValueRange (e.g., as shown in FIG. 6D). A customization developer is free to implement the interfaces in their most convenient way. In customization framework, CustomizationController (e.g., as shown in FIG. 6A) automatically chooses the correct implementation and forwards it to application's run time and configuration time units.

For example, in a sales and distribution management system, a user needs to customize different components, such as sales order processing, delivery processing, and transportation processing components. Here "sales and distribution management", "sales order", "delivery", "transportation" are each represented as a corresponding customization category class in an object oriented programming environment, which implements the standard interface CustomizationCategory as shown in FIG. 6B. The last three categories are sub-categories of the first one. The implementation is as following code shows.

```
public class SDManagementCategory implements CustomizationCategory{ };
public class SalesOrderCategory implements CustomizationCategory{ };
public class DeliveryCategory implements CustomizationCategory{ };
public class TransportationCategory implements CustomizationCategory { };
```

The customization category SalesOrderCategory contains several customization entries as shown in FIG. 6C. One of them is "Delivery Automatic Creation" which determines whether the delivery document is created automatically after sales order is created.

```
public class DeliveryAutomaticCreation implements CustomizationEntry { };
```

It has a value range: "true" and "false", which is represented by the following implementation.

```
public class BooleanValueRange
        implements CustomizationValueRange {
    ......
}
```

There is no fixed rule about the granularity of a category and how to organize category trees. The customization developers define them according to context and experience. The access to categories and entries is centrally controlled by the SDCustomizationController class, which is based on a base class as shown in FIG. 6A and illustrated as following pseudo code as an example.

```
public class SDCustomizationController implements
    CustomizationController {
}
```

Referring to FIG. 6A, with respect to ArrayList< CustomizationCategory>SDCustomizationController.getAll Categories( ) this method will return all customization category objects under the control of SDCustomizationController, namely an instance of class SDManagementCategory.

The following method

```
ArrayList<CustomizationCategory>
    SDManagementCategory.getAllSubCategories( );
``` returns three objects. They are instances of class SalesOrderCategory, DeliveryCategory, and TransportationCategory. The implementation classes are transferred to and handled by the customization framework. For example, the following method

```
public void SDCustomizationController.setCustomizaitonValue(
    CustomizationEntry entry, Object value,
    ArrayList<Object> conditions, CustomizaitonUIInfo ui_info);
``` writes customization value and related customization UI information to backend storage. It is called by a UI developer when the UI developer needs to write customized data from user interface into persistent storage. The parameter entry is the instance of a customization entry, value is the entry value set by the user, conditions contains the run time prerequisite conditions of such a value, parameter ui_info describes the UI navigation path of the customization entry. The UI developer knows exactly where this customization entry is located in user interface and binds that information with customization entry.

Customization entry is evaluated during run time by the program written by an application developer. For example, the following method

```
public Object SDCustomizationController.getCustomizationValue(
    Customizationentry entry, ArrayList<Object> conditions) throws
    NoSuchCustomizaitonEntryFoundException,
    NoAssociatedTransactionException;
``` is called by the application developer to get the current value of a customization entry. That entry is input as parameter entry.

The customization value is used by an application to determine the application behavior or the flow of business process. The following method
    ArrayList<CustomizationEntry>SalesOrderCategory. getAllEntries( );
returns all entries of SalesOrderCategory. One of them is the instance of class DeliveryAutomaticCreation. In order to get the data type of customization values, the following method is called.
    Class DeliveryAutomaticCreation.getType( );
This method returns the instance Boolean.Class. So the valid data type is Boolean. For the legal value range, the developer needs to call
    CustomizaitonValueRange DeliveryAutomaticCreation. getValueRange( );
This method returns an instance of class BooleanValueRange. This determines that the valid values of DeliveryAutomaticCreation are either true or false. If the value is true, the delivery order will be created automatically after the sales order is created. Otherwise the creation of sales order would not trigger delivery creation.

The content of the tree of all customization categories and entries is defined by customization developer. Customization developer defines the tree structure by implementing the getAllSubCategories and getAllEntries method with his/her own logic. Possible values of entries are defined by implementing the CustomizationValueRange interface. Value setting and retrieval are done by the storage-medium-specific implementation of method setCustomizationValue and getCustomizationValue of interface CustomizationController. The customization developer's implementation of interface CustomizationController is the central access point for a UI developer and an application developer to carry out customization work.

The UI developer gets the instance of CustomizationController via CustomizaitonAccessor. This class is part of the customization framework and is shown in the center of FIG. 2A. Before any customization activity can be performed, a UI developer calls the method of
    CustomizationController CustomizaitonAccessor.getCustomizationController(Properties properties)
to get an instance of CustomizationController. The input parameter properties specifies which customization implementation module should be called. The customization framework looks up for the specified implementation and returns the generated CustomizationController instance to the caller.

When a user sets the value of a certain customization entry, the following method is called:

```
public void SDCustomizationController.
    setCustomizaitonValue(CustomizationEntry
        entry_name, Object value, ArrayList<Object> conditions,
        CustomizaitonUIInfo ui_info);
```

The invocation of this method is programmed by a UI developer. As motioned before, the UI developer knows where the customization entry is located in the user interface. So the UI developer is the person responsible of binding the location information with customization entry. The location information is represented as path info like "Sales and Distribution->Sales Order Processing->Delivery Automatic Creation", for example, as shown in FIG. 6G.

An application developer instantiates CustomizationController via CustomizaitonAccessor and handles CustomizationCategory, CustomizationEntry, CustomizationValueRange in a similar way as a UI developer. But different from the UI developer, the application developer does not call the setCustomizaitonValue method because the application developer does not need to set any customization entry value.

Most of the time, the application developer calls the method of

```
public Object SDCustomizationController.getCustomizationValue(
    CustomizationEntry entry, ArrayList<Object> conditions)
    throws NoSuchCustomizaitonEntryFoundException,
        NoAssociatedTransactionException;
``` to get the current value of a specific customization entry. That customization value will determine the business process, application output or other related application behaviors. The following pseudo code shows how customization entry value determines business process:

```
if DeliveryAutomaticCreation is true
{
        extract data from sales order;
        create delivery document;
}
else{
        set delivery order to null;
}
```

The customization value evaluation may be performed within the scope of RCE transaction, which is the essential part of this solution. RCE transaction (also referred to as "RCE transaction" to "transaction") is a procedure including a series of customization evaluation (customization value retrieval). In this procedure, the application run time evaluates specific customization entries which are relevant to current working context. At the same time, those value retrieval activities are recorded into a transaction log by the customization framework. An end user would be interested in this log when the end user needs to understand which customization entries are affecting the behavior of the application in current context. Since the corresponding customization UI information is stored together with each customization entry, the UI information is also included in the transaction log. It would be quite easy for end user to navigate to the correct environment for setting that customization entry.

The granularity of transaction is decided by an application developer according to requirement and context. In order to start an RCE transaction, the method of

```
void CustomizaitonAccessor.beginTransaction(String name) throws
      AnotherTransactionStartedException;
``` is called by an application developer. This method activates the log in which all the customization evaluation activities are recorded. An example of a result log is shown in FIG. 6G.

With such a log at hand, a user can easily understand what customization entries result in the current application behavior. When a transaction is finished, the method

```
void CustomizaitonAccessor.endTransaction(String name) throws
      AnotherTransactionStartedException;
``` is called. Afterwards the customization framework stops writing log information. The method of String CustomizaitonAccessor.getReport(boolean ui_info_included);

returns the log of the most recent RCE transaction.

Referring to FIG. 6G, the last four records (since 18:08: 12) of the log demonstrate a business process determination procedure: when software user create sales order, the value customization entry "DeliveryAutoCreation" is read to determine whether subsequent delivery should be generated.

For example, the following log record

[2007.03.08 18:08:12] UIInfo= Transaction SPRO ->...-> Checkbox "Delivery Created Automatically"

provides the UI information (e.g., the path to the place where the value of customization entry "DeliveryAutoCreation" is set). If a software user wants to customize this entry (e.g. for any sales order), the user follows the path. One example is that the path is a hyperlink. It points to the window where the software user can set the customization entry "DeliveryAutoCreation". In this way, the customization environment is connected to current working context. The software user is able to customize the user's software even if the user is unfamiliar with the whole customization info-structure.

Thus, with the techniques described above, an application end user can easily find the customization entry in current context without a complete knowledge of the customization info-structure. In addition, the log information reveals the customization entries that influence application behavior and business process. This helps software end users better understand the application. This provides an easy-to-use and flexible framework to software vendors. Further, a customization developer, UI developer and application developer can concentrate on their own tasks. For example, a reader of a customization entry does not need to know where the entry is physically stored or how it is set via a user interface. The log, which enables the end user's easy customization, is automatically and precisely generated. An application developer does not need to know about the log writing.

FIG. 7 is a high level block diagram of a processing system, in which the above introduced technique can be implemented. For example, the system as shown in FIG. 7 may be implemented as part of system as shown in FIG. 2A. Certain standard and well-known components which are not germane to the present invention are not shown. The processing system includes one or more processors 701 coupled to a bus system 704.

The bus system 704 in FIG. 7 is an abstraction that represents any one or more separate physical buses and/or point-to-point connections, connected by appropriate bridges, adapters and/or controllers. The bus system 704, therefore, may include, for example, a system bus, a form of Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

The processors 701 are the central processing units (CPUs) of the processing system and, thus, control the overall operation of processing system. In certain embodiments, the processors 701 accomplish this by executing software stored in memory 702. A processor 701 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 702 coupled to the bus system 704. The memory 702 represents any form of random access memory (RAM), read-only memory (ROM), flash memory, or a combination thereof. Memory 702 stores, among other things, the operating system 703 of the processing system.

Also connected to the processors 701 through the bus system 704 are a mass storage device 705, a storage adapter 706, and a network adapter 707. Mass storage device 705 may be or include any conventional medium for storing large quantities of data in a non-volatile manner, such as one or more disks. The storage adapter 706 allows the processing system to access external storage systems. The network adapter 707 provides the processing system with the ability to communicate with remote devices and may be, for example, an Ethernet adapter or a Fibre Channel adapter. Memory 702 and mass storage device 705 store software instructions and/or data, which may include instructions and/or data used to implement the techniques introduced here.

Thus, a method and system for customizing a software application have been described. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for customizing software applications, the method comprising:
   generating customization data determining runtime behavior of one or more functions of a software application, wherein the customization data is generated independently from development of the software application, and wherein generating the customization data includes:
      during a first execution of the software application, logging access to at least one customization entry associated with an executed function of the software application;
      providing a log report that indicates: i) the at least one customization entry, ii) how each customization entry is accessed by the function, and iii) how each customization entry is evaluated during execution of the function, wherein the log report further indicates, for each customization entry, a path of navigating, within a customization user interface, from a root node to a node representing the respective customization entry in the customization interface; and
      receiving, through the customization user interface, the customization data that includes a value for each customization entry associated with the executed function of the software application;
   storing the customization data in memory; and
   during a second execution of the software application subsequent to the first execution:
      receiving a request for execution of the function of the software application;
      determining the at least one customization entry corresponding to the function, relevant to a current working context of a user;
      obtaining, from the customization data, the respective value for each customization entry, wherein the value of the respective customization entry affects how the function is performed;
      obtaining, from the customization data, information regarding how to locate each customization entry in the customization user interface of the software application; and
      executing the function based on the respective value for each customization entry corresponding to the function.

2. The method of claim 1, wherein the current working context of the user is used for locating customization options in the customization user interface of the software application.

3. The method of claim 2, wherein the customization user interface includes a tree structure having a root node and a plurality of other nodes, the root node and the plurality of other nodes representing one or more corresponding customization categories and one or more corresponding customization entries.

4. The method of claim 3, wherein the corresponding one or more customization entries are combined together to determine behavior of the software application at runtime.

5. The method of claim 3, wherein the one or more corresponding customization entries are evaluated and the procedure of evaluation is recorded as a log.

6. The method of claim 5, wherein the log allows the user to identify which of the one or more corresponding customization entries are involved in the current working context.

7. The method of claim 5, wherein the log to indicate at least one of:
- a list of customization entries accessed during execution of the function of the software application,
- how each customization entry, from the list of customization entries, is accessed by the function of the software application, or
- how each customization entry, from the list of customization entries, is evaluated during execution of the function of the software application.

8. A system comprising:
- a processor; and
- a memory coupled to the processor, to store instructions executed by the processor to:
  - generate customization data that determines runtime behavior of one or more functions of a software application, wherein the customization data is generated independently from development of the software application, and wherein generating the customization data includes:
    - during a first execution of the software application, logging access to at least one customization entry associated with an executed function of the software application;
    - providing a log report that indicates: i) the at least one customization entry, ii) how each customization entry is accessed by the function, and iii) how each customization entry is evaluated during execution of the function, wherein the log report further indicates, for each customization entry, a path of navigating, within a customization user interface, from a root node to a node representing the respective customization entry in the customization interface; and
    - receiving, through the customization user interface, the customization data that includes a value for each customization entry associated with the executed function of the software application;
  - during a second execution of the software application subsequent to the first execution:
    - receive a request for execution of the function of the software application;
    - determine the at least one customization entry corresponding to the function, relevant to a current working context of a user;
    - obtain, from the customization data, the respective value for each customization entry, wherein the value of the respective customization entry affects how the function is performed; and
    - execute the function based on the respective value for each customization entry corresponding to the function.

9. The system of claim 8, wherein the current working context of the user is used for locating customization options in a customization user interface of the software application.

10. The system of claim 9, wherein the customization user interface includes a tree structure having a root node and a plurality of other nodes, the root node and said plurality of other nodes representing one or more corresponding customization categories and one or more corresponding customization entries.

11. The system of claim 10, wherein the one or more corresponding customization entries are combined together to determine behavior of the software application at runtime.

12. The system of claim 11, wherein the one or more corresponding customization entries are evaluated and the procedure of evaluation is recorded as a log.

13. The system of claim 12, wherein the log allows the user to identify which of the one or more corresponding customization entries are involved in the current working context.

14. The system of claim 12, wherein the log to indicate at least one of:
- a list of customization entries accessed during execution of the function of the software application,
- how each customization entry, from the list of customization entries, is accessed by the function of the software application, or
- how each customization entry, from the list of customization entries, is evaluated during execution of the function of the software application.

15. A non-transitory machine readable storage medium having computer executable instructions that when executed cause a processor to perform operations comprising:
- generate customization data determining runtime behavior of one or more functions of a software application, wherein the customization data is generated independently from development of the software application, and wherein generating the customization data includes:
  - during a first execution of the software application, logging access to at least one customization entry associated with an executed function of the software application;
  - providing a log report that indicates: i) the at least one customization entry, ii) how each customization entry is accessed by the function, and iii) how each customization entry is evaluated during execution of the function, wherein the log report further indicates, for each customization entry, a path of navigating, within a customization user interface, from a root node to a node representing the respective customization entry in the customization interface; and
  - receiving through the customization user interface, the customization data that includes a value for each customization entry associated with the executed function of the software application;
- store the customization data in memory; and
- during a second execution of the software application subsequent to the first execution:
  - receive a request for execution of the function of the software application;
  - determine the at least one customization entry corresponding to the function, relevant to a current working context of a user;
  - obtain, from the customization data, the respective value for each customization entry, wherein the value of the respective customization entry affects how the function is performed; and
  - execute the function based on the respective value for each customization entry corresponding to the function.

16. The non-transitory machine readable storage medium of claim 15, wherein the current working context of the user is used for locating customization options in a customization user interface of the software application.

17. The non-transitory machine readable storage medium of claim 16, wherein the customization user interface includes a tree structure having a root node and a plurality of other nodes, the root node and the plurality of other nodes representing one or more corresponding customization categories and one or more corresponding customization entries.

18. The non-transitory machine readable storage medium of claim 17, wherein the corresponding one or more customization entries are combined together to determine behavior of the software application at runtime.

19. The non-transitory machine readable storage medium of claim 17, wherein the one or more corresponding customization entries are evaluated and the procedure of evaluation is recorded as a log, wherein the log allows the user to identify which of the one or more corresponding customization entries are involved in the current working context.

20. The non-transitory machine readable storage medium of claim 19, wherein the log to indicate at least one of:
- a list of customization entries accessed during execution of the function of the software application,
- how each customization entry, from the list of customization entries, is accessed by the function of the software application, or
- how each customization entry, from the list of customization entries, is evaluated during execution of the function of the software application.

* * * * *